United States Patent
Poulet et al.

(10) Patent No.: US 8,641,925 B2
(45) Date of Patent: *Feb. 4, 2014

(54) USE OF YTTRIUM, ZIRCONIUM, LANTHANUM, CERIUM, PRASEODYMIUM AND/OR NEODYMIUM AS REINFORCING AGENT FOR AN ANTICORROSION COATING COMPOSITION

(75) Inventors: Jean-Marie Poulet, Fontaine Chaalis (FR); Alain Chesneau, Creile (FR); Carmen Delhalle, Breuil le Sec (FR)

(73) Assignee: NOF Metal Coatings Europe, Zaet De Creil Saint Maximin Creil (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/293,229

(22) Filed: Nov. 10, 2011

(65) Prior Publication Data

US 2012/0052294 A1 Mar. 1, 2012

Related U.S. Application Data

(62) Division of application No. 10/564,934, filed as application No. PCT/IB2004/002450 on Jul. 13, 2004, now Pat. No. 8,080,176.

(30) Foreign Application Priority Data

Jul. 15, 2003 (FR) ...................................... 03 08596

(51) Int. Cl.
*C09K 3/00* (2006.01)
*C23F 11/00* (2006.01)
*C04B 9/02* (2006.01)

(52) U.S. Cl.
USPC ........ 252/387; 106/14.21; 428/336; 428/418; 428/447; 428/450; 428/469; 523/458; 524/403; 524/406

(58) Field of Classification Search
USPC .................. 106/14.05, 14.21, 14.44; 252/387; 427/385.5, 386, 387, 388.4, 397.8; 428/336, 418, 447, 450, 457, 469; 523/458; 524/403, 406

See application file for complete search history.

(56) References Cited

U.S. PATENT DOCUMENTS

| | | | |
|---|---|---|---|
| 3,864,093 | A | 2/1975 | Wolfla |
| 4,470,853 | A | 9/1984 | Das et al. |
| 4,724,172 | A | 2/1988 | Mosser et al. |
| 4,749,550 | A * | 6/1988 | Goldie et al. ................... 422/19 |
| 5,250,325 | A | 10/1993 | Phillips et al. |
| 5,399,210 | A | 3/1995 | Miller |
| 5,458,678 | A | 10/1995 | Armstrong et al. |
| 5,776,569 | A * | 7/1998 | Cole ............ 428/35.8 |
| 5,868,819 | A | 2/1999 | Guhde et al. |
| 5,879,647 | A | 3/1999 | Wataya et al. |
| 5,964,928 | A | 10/1999 | Tomlinson |
| 6,190,525 | B1 | 2/2001 | Karabin et al. |
| 6,248,184 | B1 | 6/2001 | Dull et al. |
| 6,312,812 | B1 | 11/2001 | Hauser et al. |
| 6,579,472 | B2 | 6/2003 | Chung et al. |
| 8,080,176 | B2 * | 12/2011 | Poulet et al. ................... 252/387 |
| 2001/0042491 | A1 | 11/2001 | Shimakura et al. |
| 2002/0142611 | A1 | 10/2002 | O'Donnell et al. |
| 2002/0162749 | A1 | 11/2002 | Emmonds et al. |
| 2004/0062873 | A1 | 4/2004 | Jung et al. |

FOREIGN PATENT DOCUMENTS

| | | |
|---|---|---|
| DE | 693 25 344 T2 | 1/2000 |
| EP | 0 808 883 A2 | 11/1997 |
| EP | 1 233 043 A2 | 8/2002 |
| FR | 2816641 | 5/2002 |
| FR | WO 0238686 | 5/2002 |
| JP | 3007785 | 1/1991 |
| SU | 1049567 | 10/1983 |
| WO | WO 02/38686 A2 * | 5/2002 ............... C09D 5/08 |

OTHER PUBLICATIONS

K. Aramaki, "Treatment of zinc surface with cerium (III) nitrate to prevent zinc corrosion in aerated 0.5 M NaCl", Corrosion Science, 2001, 2201-2215, 43.

M. Bethencourt, F.J. Botana, M.A. Cauqui, M. Marcos, M.A. Rodriguez, J.M. Rodriguez-Izquierdo, "Protection against corrosion in marine environments of AA5083 Al-Mg alloy by lanthanide chlorides", Journal of Alloys and Compounds, 1997, 455-4600, 250.

S. Lyon, "Conference reports 2nd National Measurement Conference", British Corrosion Journal, 2002, 90-98, vol. 37, No. 2.

R. Guerrero, M.H. Farias, L. Cota-Araiza, "Corrosion study of Zn-22Al-2Cu alloy coated with Y2O3", Surface and Coatings Technology, 2002, 218-222, 154.

A. Kumar, T. Anadraj, S.M. Krishnan, F. Mathiyarasu, V. Ganesh, T.S. Prasanna Kumar, S.A. Venkatesh, D. Mukherjee, S. Mukherjee, "Mechano-electrochemical approach for 304 SS interface covered with polymeric coating materials reinforced with exotic rare earth oxides", Pigment & Resin Technology, Nov. 5, 2000, 273-276, vol. 29.

R. Liu, D.Y. Li, "Protective effect of yttrium additive in lubricants on corrosive wear", Wear, 1999, 968-974, 225-229.

R. Liu, D.Y. Li, "Effects of yttrium and cerium additives in lubricants on corrosive wear of stainless steel 304 and Al alloy 6061", Journal of Materials Science, 2000, 633-641, 35.

(Continued)

*Primary Examiner* — Bijan Ahvazi

(74) *Attorney, Agent, or Firm* — Mark E. Bandy; Rankin, Hill & Clark LLP

(57) ABSTRACT

The subject of the present invention is the use of at least one element chosen from among yttrium, zirconium, lanthanum, cerium, praseodymium and neodymium, in the form of oxides or salts, as reinforcing agent for the anticorrosion properties of an anticorrosion coating composition containing a particulate metal, in aqueous or organic phase, for metal parts.

44 Claims, No Drawings

(56) References Cited

OTHER PUBLICATIONS

L. Mathivanan, A.K. Arof, "The effect of zirconium oxide and quartz pigments on the heat and corrosion resistance properties of the silicone based coatings", Pigment & Resin Technology, Nov. 1, 2000, 10-15, vol. 29.

S. Powell, "Evaluation of Alternative Corrosion Inhibitors to Chromate for Use in Organic Coatins Using Scanning Reference Electrode Technique", Surface Engineering, 2000, 169-175, vol. 16, No. 2.

A.L. Rudd, C.B. Breslin, F. Mansfeld, "The corrosion protection afforded by rare earth conversion coatings applied to magnesium", Corrosion Science, 2000, 275-288, 42.

H.C. Starck, "Sicherheitsdatenblatt", Jan. 18, 2002, (1 page).

T. Zhang, Y. Luo, D.Y. Li, Erosion behavior of aluminide coating modified with yttrium addition under different erosion conditions:, Surface and Coatings Technology, 2000, 102-109, 126.

T. Zhang, D.Y. Li, Improvement in the corrosion-erosion resistance of 304 stainless steel with alloyed yttrium:, Journal of Materials Science, 2001, 3479-3486, 36.

T. Zhang, D.Y. Li, "Effects of yttrium on corrosive erosion and dry sand erosion of FeAlCr(Y) diffusion coatings on 1030 steel", Materials Science and Engineering, 2000, 18-24, A277.

International Search Report, Nov. 18, 2004 (3 pages) for application PCT/IB2004/002450.

\* cited by examiner

USE OF YTTRIUM, ZIRCONIUM, LANTHANUM, CERIUM, PRASEODYMIUM AND/OR NEODYMIUM AS REINFORCING AGENT FOR AN ANTICORROSION COATING COMPOSITION

CROSS REFERENCES TO RELATED APPLICATIONS

This application is a divisional and claims priority from U.S. application Ser. No. 10/564,934 filed on Jan. 13, 2006 which is a 371 of PCT/IB04/02450 filed on Jul. 13, 2004 which claims priority from FR 0308596 filed on Jul. 15, 2003.

The present invention sets out to develop an anticorrosion coating for metal parts, preferably free of hexavalent chromium, that has improved anticorrosion properties.

The present invention applies to all types of metal parts, in particular in steel or cast iron or whose surface is formed of a layer of zinc or zinc alloy, which require high resistance to corrosion, on account of their intended use in the automotive industry for example. Anticorrosion coating compositions, free of hexavalent chromium, have already been recommended. Some of these compositions contain a particulate metal. The particulate metal, such as zinc and/or aluminium, is in suspension in the composition and provides the metal part with sacrificial protection against a corrosive medium. Aqueous anticorrosion coating compositions for example have been described for metal parts, containing a particulate metal, an appropriate solvent, a thickener and a binder formed of a silane. Particulate metal-based compositions have also been described whose storage stability and anticorrosion performance are improved through the incorporation of molybdenum oxide ($MoO_3$) in the composition.

Within the scope of the present invention, the applicant has discovered that it is possible to improve the anticorrosion properties of compositions containing particulate metal by incorporating therein at least one element chosen from among yttrium, zirconium, lanthanum, cerium, praseodymium and neodymium, in the form of oxides or salts.

The anticorrosion performance of coating compositions containing particulate metal prove to be further improved when the above-cited elements are associated with molybdenum oxide.

The compositions containing particulate metal concerned by the present invention may be aqueous phase or organic phase compositions. They are recommended when high resistance to corrosion is required.

The subject of the present invention is therefore the use of at least one element chosen from among yttrium, zirconium, lanthanum, cerium, praseodymium and neodymium in the form of oxides or salts, as agent to reinforce the anticorrosion properties of an anticorrosion coating composition containing a particulate metal, in aqueous or organic phase, for metal parts.

A further subject of the invention is the use of at least one of the above-cited elements, optionally associated with molybdenum oxide $MoO_3$, as reinforcing agent for the anticorrosion properties of an anticorrosion coating composition containing a particulate metal, in aqueous or organic phase, for metal parts.

Without this interpretation being restrictive, it would seem that the presence of at least one of the above-cited elements makes it possible to reinforce the efficacy of the anticorrosion protection imparted by the particulate metal in the composition.

The particulate metal present in the composition is preferably added in powder form, of different geometric, homogeneous or heterogeneous structures, in particular spherical, laminar, lenticular forms or other specific forms.

The oxides or salts of the above-cited elements which are used as reinforcing agents for the anticorrosion properties of the composition, are generally in powder form whose particles have a $D_{50}$ of less than 20 µm (the value $D_{50}$ means that 50% by number of the particles have a particle size of less than this value, and 50% by number of the particles have a particle size greater than this value). During the preparation of the coating composition, a prior particle grinding or dispersion step (to break up agglomerates into elementary particles) may be conducted so that the composition contains particles with a $D_{50}$ of less than 3 µm.

These oxides or salts may be fully soluble, partially soluble or completely insoluble in aqueous phase or organic phase. They may be in dispersed or solubilised form within the composition.

Yttrium salts are advantageously chosen from among yttrium acetate, chloride, formate, carbonate, sulfamate, lactate, nitrate, oxalate, sulfate, phosphate and aluminate ($Y_3Al_5O_{12}$), and their mixtures.

Yttrium oxide is advantageously in the form $Y_2O_3$.

Yttrium is preferably used in oxide form.

The yttrium oxide $Y_2O_3$ used to prepare the coating composition is generally in the form of particles having a size of between 1 µm and 40 µm, with a $D_{50}$ of approximately 6 to 8 µm. When preparing the coating composition, a prior particle grinding or dispersion step (to break up agglomerates into elementary particles) may be conducted so that the composition contains particles having a $D_{50}$ of less than 3 µm.

Zirconium salts are preferably chosen from among zirconium carbonate, silicate, sulfate, and titanate, and their mixtures.

Zirconium oxide is advantageously in the form $ZrO_2$.

Lanthanum salts are advantageously chosen from among lanthanum acetate, oxalate, nitrate, sulfate, carbonate, phosphate and aluminate ($LaAlO_3$), and their mixtures.

Lanthanum oxide is preferably in the form $La_2O_3$.

Cerium salts are advantageously chosen from among cerium chloride, carbonate, acetate, nitrate, oxalate, sulfate, phosphate, molybdate ($Ce_2(MoO_4)_3$) and tungstate ($Ce_2(WO_4)_3$), and their mixtures.

Cerium oxide is advantageously in the form $CeO_2$.

Cerium is preferably used in the form of cerium chloride or $CeO_2$.

Praseodymium salts are advantageously chosen from among praseodymium carbonate, chloride, nitrate, oxalate and sulfate, and their mixtures.

Praseodymium oxide is advantageously in the form $Pr_6O_{11}$.

Neodymium salts are advantageously chosen from among neodymium carbonate, chloride, nitrate and sulfate, and their mixtures.

Neodymium oxide is advantageously in the form $Nd_2O_3$.

When the composition also contains molybdenum oxide $MoO_3$ associated with one of the above-cited elements used as reinforcing agent for the anticorrosion properties of the composition, $MoO_3$ is advantageously incorporated in essentially pure orthorhombic crystalline form, having a molybdenum content of more than around 60% by weight.

Preferably, the molybdenum oxide $MoO_3$ is in the form of particles having a size of between 1 µm and 200 µm.

Preferably, said reinforcing agent for the anticorrosion properties of the composition is associated with molybdenum oxide $MoO_3$ in a weight ratio of 0.25<anticorrosion property reinforcing agent:$MoO_3$<20, preferably 0.5<anticorrosion property reinforcing agent:$MoO_3$<16, further preferably 0.5<anticorrosion property reinforcing agent:$MoO_3$<14.

Preferably yttrium oxide $Y_2O_3$ is used in association with molybdenum oxide $MoO_3$. A further subject of the invention is the use of yttrium oxide $Y_2O_3$ in association with molybdenum oxide $MoO_3$ in a weight ratio of 0.25<$Y_2O_3$: $MoO_3$<20, preferably 0.5<$Y_2O_3$: $MoO_3$<16, further preferably 0.5<$Y_2O_3$: $MoO_3$<14.

A further subject of the invention concerns anticorrosion coating compositions for metal parts, comprising:
  at least one particulate metal;
  a reinforcing agent for the anticorrosion properties of the composition, chosen from among yttrium, zirconium, lanthanum, cerium, praseodymium and neodymium, in the form of oxides or salts, optionally associated with molybdenum oxide $MoO_3$;
  a binder; and
  either water, optionally associated with one or more organic solvents, or one or more organic solvents miscible inter se.

The coating composition contains at least one particulate metal, i.e. one or more particulate metals.

Advantageously, the particulate metal content lies between 10% and 40% by weight relative to the weight of the composition.

The particulate metal may be chosen from among zinc, aluminium, tin, manganese, nickel, their alloys, and their mixtures.

Preferably the particulate metal is chosen from among zinc, aluminium, their alloys and their mixtures. Preferably the alloys are chosen from the alloys of zinc and aluminium containing at least 3% by weight aluminium, preferably 7% by weight of aluminium, and the zinc and tin alloys containing at least 10% by weight of tin.

The content of anticorrosion property reinforcing agent of the composition preferably lies between 0.5% and 10% by weight relative to the weight of the composition, preferably between 1% and 8% by weight relative to the weight of the composition, further preferably between 1% and 7% by weight relative to the weight of the composition.

The reinforcing agent for the anticorrosion properties of the composition is advantageously yttrium, preferably in the oxide form $Y_2O_3$, or cerium preferably in the form of cerium chloride.

The reinforcing agent for the anticorrosion properties of the composition is advantageously associated with molybdenum oxide $MoO_3$ in a weight ratio of 0.25<anticorrosion property reinforcing agent:$MoO_3$<20, preferably 0.5<anticorrosion property reinforcing agent:$MoO_3$<16, further preferably 0.5<anticorrosion property reinforcing agent: $MoO_3$<14.

The binder content preferably lies between 3% and 20% by weight relative to the weight of the composition. The binder may be of organic and/or mineral type in aqueous or organic phase. The choice of the binder depends on different criteria, among which is the baking temperature of the coating composition.

The binder is preferably chosen from among an alcoxylated slime, optionally organofunctionalised, such as γ-glycidoxypropyltrimethoxysilane or γ-glycidoxy-propyltrimethoxysilane, a silicone resin, a silicate of sodium and/or potassium and/or lithium, a zirconate, a titanate, an epoxy resin, a phenoxy resin, an acrylic and their mixtures.

The binder may be associated with a crosslinking agent of phenolic type, aminoplast type, or dicyandiamide type. Acid catalysts may also be added in order to catalyse the crosslinking reaction.

If the composition is in aqueous phase, a colloidal silica may be used in association with resins, as binder.

If the coating composition is in aqueous phase, the liquid phase is formed of water and may also contain up to 30% by weight of an organic solvent or a mixture of organic water-miscible solvents.

If the coating composition is in organic phase, the liquid phase is entirely made up of an organic solvent or a mixture of organic solvents miscible inter se.

The organic solvent or solvents are chosen in relation to the binder, so as to solubilise the latter or stabilise a dispersion thereof. The organic solvent or solvents are advantageously chosen from white spirit, alcohols, ketones, aromatic solvents and glycol solvents such as glycol ethers, in particular diethyleneglycol, triethyleneglycol and dipropyleneglycol, acetates, polyethyleneglycol and nitropropane, and their mixtures.

The coating composition may also contain a thickener if the type of application so requires, if it is to be applied by dipping-centrifuging for example.

The content of thickening agent is advantageously less than 7% by weight relative to the weight of the composition, preferably between 0.005% and 7% by weight relative to the weight of the composition.

The thickening agent is advantageously chosen from among the cellulose derivatives such as hydroxymethylcellulose, hydroxyethylcellulose, hydroxy-propylcellulose or hydroxypropylmethylcellulose, xanthane gum, associative thickeners of polyurethane or acrylic type, silicas, silicates such as silicates of magnesium and/or lithium optionally treated, or organophilic clays, and their mixtures.

The coating composition may also comprise a lubricating agent in sufficient quantity to obtain a self-lubricated system, chosen in particular from among polyethylene, polytetrafluoroethylene, $MoS_2$, graphite, polysulfones, synthetic or natural waxes and nitrides, and their mixtures.

If it is in aqueous phase, the coating composition may also contain other additives compatible with the binder, chosen from among an anti-foam agent such as Schwego foam (emulsified hydrocarbon) from Schwegman, a wetting agent such as an ethoxylated monylphenol or an ethoxylated polyalcohol, a surfactant agent such as Aerosol TR 70 (sodium sulfosuccinate) from Cytec, and a biocide such as Ecocide $D_{75}$ from Progiva, and a weak acid such as boric acid to adjust the pH of the composition.

In preferred manner, the coating composition contains the following ingredients:
  10% to 40% by weight of at least one particulate metal;
  0.5% to 10% by weight of an anticorrosion property reinforcing agent for the composition chosen from yttrium, zirconium, lanthanum, cerium, praseodymium and neodymium, in the form of oxides or salts, optionally associated with molybdenum oxide $MoO_3$;
  up to 7% by weight of a thickener;
  3% to 20% by weight of a binder;
  up to 3% by weight, preferably 0.05% to 2% by weight of a sodium and/or potassium and/or lithium silicate;
  up to 7% by weight of one or more lubricating agents;
  1% to 30% by weight of an organic solvent or a mixture of organic solvents;
  optionally 0.1% to 10% by weight of a weak mineral acid such as boric acid;
  optionally 0.01% to 1% by weight of an anionic surfactant; and
  water to make up to 100%.

If the above-cited anticorrosion property reinforcing agent is associated with molybdenum oxide, the latter preferably represents 0.5% to 2% by weight of the composition.

Evidently, the present invention also extends to anticorrosion coatings applied to metal parts using the above-cited compositions.

Application may be made by spraying, dipping-draining or dipping-centrifuging, the layer of coating then being subjected to a baking operation (by convection or infrared for example) preferably conducted at a temperature of between 70° C. and 350° C., for approximately 10 to 60 minutes, by convection.

According to one advantageous embodiment, the anticorrosion coating derives from an application operation involving, prior to the baking operation, a drying operation of the coated metal parts (by convection, or infrared for example), in particular by convection at a temperature in the region of 70° C. for approximately 10 to 30 minutes on line.

Under these conditions, the thickness of the dry film so applied lies between 3 μm (11 g/m$^2$) and 15 μm (55 g/m$^2$), preferably between 4 μm (15 g/m$^2$) and 10 μm (40 g/m$^2$), further preferably between 5 μm (18 g/m$^2$) and 10 μm (40 g/m$^2$).

The present invention also extends to the metal substrate, preferably in steel, provided with an anticorrosion coating applied using the above-cited compositions.

This itself may be coated with another coating to further reinforce some properties, such as anticorrosion protection or lubrication. A coating to reinforce the anticorrosion protection may contain an alkaline silicate, in particular a sodium and/or potassium and/or lithium silicate, an acrylic, a zirconate, a titanate, a silane, an epoxy resin, a phenol resin or one of their mixtures, these resins optionally being associated with a colloidal silica. A coating for lubrication may contain a lubricating agent chosen from among polyethylene, polytetrafluoroethylene, MoS$_2$, graphite, polysulfones, synthetic or natural waxes, and nitrides, and their mixtures.

Corrosion Tests

A) Influence of Yttrium Oxide (Y$_2$O$_3$), in Aqueous Phase, Optionally Associated with Molybdenum Oxide (MoO$_3$) on Anticorrosion Performance.

Comparative experiments were conducted on the coating compositions given in table 1.

TABLE 1

| weight % | composition | | | |
|---|---|---|---|---|
| | 1 | 2 | 3 | 4 |
| Y$_2$O$_3$[1] | 0 | 3.0 | 0 | 3.0 |
| MoO$_3$ | 0 | 0 | 0.9 | 0.9 |
| Zinc[2] | 23.6 | | | |
| Aluminium[3] | 3.0 | | | |
| Silane A187[4] | 10.1 | | | |
| Sodium silicate 20N32[5] | 0.9 | | | |
| Rempcopal ® N4 100[6] | 1.4 | | | |
| Rempcopal ® N9 100[7] | 1.6 | | | |
| Dipropylene glycol | 7.5 | | | |
| Aerosil ® 380[8] | <0.1 | | | |
| Schwego Foam ® 8325[9] | 0.5 | | | |
| Boric acid | 0.8 | | | |
| Deionised water | Up to 100% | | | |

[1]Y$_2$O$_3$ of 99.99% purity (Rhodia)
[2]Zinc in paste form, approx. 92% in white spirit (80% Alu Stapa PG Chromal VIII, from Eckart Werke)
[3]Aluminium, approx. 80% in dipropylene glycol
[4]γ-glycidoxypropyltrimethoxysilane (Crompton)
[5]Sodium silicate (Rhodia)
[6]Wetting agent of ethoxylated nonylphenol type (Uniqema)
[7]Wetting agent of ethoxylated nonylphenol type (Uniqema)
[8]Anti-sedimentation agent of silica type (Degussa)
[9]Antifoam of hydrocarbon type.

Prepared Samples

Treated substrate: degreased, shot-blasted steel screws
Application of coating composition: dip-centrifuging
Baking: 25 min at 310° C.
Weight of coating layer: 26±2 g/m$^2$ The steel screws treated in this manner were tested with salt spray according to standard NFISO 9227. Results of salt spray resistance are given in table 2.

TABLE 2

| Composition | Y$_2$O$_3$ (weight %) | MoO$_3$ (weight %) | Resistance to salt spray (N° hours) |
|---|---|---|---|
| 1 | 0 | 0 | 140-260 |
| 2 | 3 | 0 | 840 |
| 3 | 0 | 0.9 | 500 |
| 4 | 3 | 0.9 | 1300 |

Table 2 clearly shows that the addition of yttrium oxide Y$_2$O$_3$ to coating compositions increases resistance to salt spray in samples treated with these compositions.

Also, when yttrium oxide Y$_2$O$_3$ is associated with molybdenum oxide MoO$_3$, the anticorrosion performance is further improved. An interaction is observed or a synergy effect between Y$_2$O$_3$ and MoO$_3$, which increases the composition's anticorrosion performance.

B) Influence of Zinc Alloyed with 7% Aluminium (Stapa Zn$_4$Al$_7$, from Eckkaxt Werke) on Anticorrosion Performance Comparative experiments were conducted on the coating compositions listed in table 3.

TABLE 3

| composition | |
|---|---|
| 5 | Identical to composition n° 3 |
| 6 | Identical to composition n° 4 |
| 7 | Identical to composition n° 4 with the difference that 30% by weight zinc is replaced by zinc alloyed with 7% by weight of aluminium (Stapa Zn$_4$Al$_7$, from Eckart Werke). |

Prepared Samples:

treated substrate: degreased, shot-blasted steel screws
Application of coating composition: dip-centrifuging
Baking: 25 min at 310° C.
Weight of coating layer: 26±2 g/m$^2$ The steel screws were treated with the coating compositions in table 3, then tested with salt spray according to standard NFISO 9227.

Results of resistance to salt spray are given in table 4.

TABLE 4

| Composition | Y$_2$O$_3$ (weight %) | MoO$_3$ (weight %) | Stapa Zn$_4$Al$_7$/Zn (weight %) | Resistance to salt spray (N° hours) |
|---|---|---|---|---|
| 5 | 0 | 0.9 | 0 | 450 |
| 6 | 3 | 0.9 | 0 | 1370 |
| 7 | 3 | 0.9 | 30 | 1900 |

Table 4 shows that the anticorrosion performance of the composition is better with alloyed zinc than with zinc.

C) Influence of Cerium Chloride in Aqueous Phase on Anticorrosion Performance

Comparative experiments were conducted on the coating compositions listed in table 5.

TABLE 5

| Composition | |
|---|---|
| 8 | Identical to composition n° 3 |
| 9 | Identical to composition n° 1 with the difference that 0.5% by weight of cerium chloride is added in addition to the other ingredients |
| 10 | Identical to composition n° 1 with the difference that 2% by weight of cerium chloride is added in addition to the other ingredients |

Prepared Samples

Treated substrate: degreased, shot blasted steel screws
Application of coating composition: dip-centrifuging
Baking: 25 min at 310° C.
Weight of coating layer: 26±2 g/m$^2$ The steel screws were treated with the coating compositions in table 5, then tested with salt spray in accordance with standard NFISO 9227.

The results of resistance to salt spray are given in table 6.

TABLE 6

| composition | Cerium chloride (weight %) | Resistance to salt spray (N° hours) |
|---|---|---|
| 8 | 0 | 200 |
| 9 | 0.5 | 500 |
| 10 | 2 | 770 |

Table 6 clearly shows that the addition of cerium chloride to coating compositions increases the resistance to salt spray of the samples treated with these compositions.

D) Influence of Yttrium Carbonate in Aqueous Phase on Anticorrosion Performance

Comparative experiments were conducted on the coating compositions listed in table 7.

TABLE 7

| Composition | |
|---|---|
| 11 | Identical to composition n° 1 |
| 12 | Identical to composition n° 3 with the difference that 0.8% by weight of MoO$_3$ is present in the composition instead of 0.9% |
| 13 | Identical to composition n° 2 with the difference that 3% by weight of Y$_2$O$_3$ are replaced with 6.9% by weight of yttrium carbonate |
| 14 | Identical to composition n° 4 with the difference that 3% by weight of Y$_2$O$_3$ are replaced with 6.9% by weight of yttrium carbonate and 0.8% by weight of MoO$_3$ are present in the composition instead of 0.9% |

Steel screws were prepared, treated and tested as in example 1. Results of salt spray resistance are given in table 8.

TABLE 8

| composition | Yttrium carbonate (weight %) | MoO$_3$ (weight %) | Resistance to salt spray (N° hours) |
|---|---|---|---|
| 11 | 0 | 0 | 288 |
| 12 | 0 | 0.8 | 400 |
| 13 | 6.9 | 0 | 288 |
| 14 | 6.9 | 0.8 | 1296 |

Table 8 clearly shows that, when yttrium carbonate is associated with molybdenum oxide MoO$_3$, the anticorrosion performance is improved. An interaction is observed or a synergy effect between yttrium carbonate and MoO$_3$, which increases the composition's anticorrosion performance.

B) Influence of Various Oxides in Aqueous Phase on Anticorrosion Performance

Comparative experiments were conducted on the coating compositions listed in table 9.

TABLE 9

| Composition | |
|---|---|
| 15 | Identical to composition n° 1 |
| 16 | Identical to composition n° 3 |
| 17 | Identical to composition n° 2 |
| 18 | Identical to composition n° 4 |
| 19 | Identical to composition n° 2 with the difference that Y$_2$O$_3$ is provided by Sogemet |
| 20 | Identical to composition n° 4 with the difference that Y$_2$O$_3$ is provided by Sogemet |
| 21 | Identical to composition n° 2 with the difference that Y$_2$O$_3$ is replaced with CeO$_2$ provided by Rhodia |
| 22 | Identical to composition n° 4 with the difference that Y$_2$O$_3$ is replaced with CeO$_2$ provided by Rhodia |
| 23 | Identical to composition n° 2 with the difference that Y$_2$O$_3$ is replaced with CeO$_2$ provided by Sogemet |
| 24 | Identical to composition n° 4 with the difference that Y$_2$O$_3$ is replaced with CeO$_2$ provided by Sogemet |
| 25 | Identical to composition n° 2 with the difference that Y$_2$O$_3$ is replaced with La$_2$O$_3$ provided by Rhodia |
| 26 | Identical to composition n° 4 with the difference that Y$_2$O$_3$ is replaced with La$_2$O$_3$ provided by Rhodia |
| 27 | Identical to composition n° 2 with the difference that Y$_2$O$_3$ is replaced with La$_2$O$_3$ provided by Sogemet. |
| 28 | Identical to composition n° 4 with the difference that Y$_2$O$_3$ is replaced with La$_2$O$_3$ provided by Sogemet |
| 29 | Identical to composition n° 2 with the difference that Y$_2$O$_3$ is replaced with Pr$_6$O$_{11}$ |
| 30 | Identical to composition n° 4 with the difference that Y$_2$O$_3$ is replaced with Pr$_6$O$_{11}$ |
| 31 | Identical to composition n° 2 with the difference that Y$_2$O$_3$ is replaced with Nd$_2$O$_3$ |
| 32 | Identical to composition n° 4 with the difference that Y$_2$O$_3$ is replaced with Nd$_2$O$_3$ |
| 33 | Identical to composition n° 2 with the difference that Y$_2$O$_3$ is replaced with ZrO$_2$ |
| 34 | Identical to composition n° 4 with the difference that Y$_2$O$_3$ is replaced with ZrO$_2$ |

E-1) Electrochemistry

Treated substrates: degreased and sanded steel plates,
Application of coating composition: by means of a hand-coater,
Baking: 25 min at 310° C.,
Weight of coating layer: 26±2 g/m$^2$.

Polarisation resistance of the coatings was measured during one hour with SOLARTRON 1250 analyzer (Schlumberger), air exposed, with a scanning rate of ±10 mV at 0.1 mV·s$^{-1}$. Results of these measurements are given in table 10. The higher the value of polarization resistance, the better the anticorrosion performance of the coatings is expected.

TABLE 10

| composition | Oxide | Oxide (weight %) | MoO$_3$ (weight %) | Polarisation Resistance ($\Omega \cdot cm^2$) |
|---|---|---|---|---|
| 15 | — | 0 | 0 | 3300 |
| 16 | — | 0 | 0.9 | 9100 |
| 17 | Y$_2$O$_3$ Rhodia | 3 | 0 | n.d. |
| 18 | Y$_2$O$_3$ Rhodia | 3 | 0.9 | 12100 |
| 21 | CeO$_2$ Rhodia | 3 | 0 | 10600 |
| 22 | CeO$_2$ Rhodia | 3 | 0.9 | 12000 |
| 23 | CeO$_2$ Sogemet | 3 | 0 | 10000 |
| 24 | CeO$_2$ Sogemet | 3 | 0.9 | 12000 |
| 25 | La$_2$O$_3$ Rhodia | 3 | 0 | n.d. |
| 26 | La$_2$O$_3$ Rhodia | 3 | 0.9 | 11900 |
| 27 | La$_2$O$_3$ Sogemet | 3 | 0 | 9300 |
| 28 | La$_2$O$_3$ Sogemet | 3 | 0.9 | 10100 |
| 29 | Pr$_6$O$_{11}$ | 3 | 0 | 9900 |
| 30 | Pr$_6$O$_{11}$ | 3 | 0.9 | 9800 |
| 31 | Nd$_2$O$_3$ | 3 | 0 | 9400 |
| 32 | Nd$_2$O$_3$ | 3 | 0.9 | 10000 |
| 33 | ZrO$_2$ | 3 | 0 | 9200 |
| 34 | ZrO$_2$ | 3 | 0.9 | 12000 |

Table 10 clearly shows that the addition of oxide of yttrium, cerium, lanthanum, praseodymium, neodymium or zirconium to coating compositions increases the polarization resistance of coatings, which indicates that the corrosion resistance of the coatings will be likely increased.

E-2) Corrosion Resistance

Steel screws were prepared, treated and tested as in example 1. Results of salt spray resistance are given in table 11.

TABLE 11

| Composition | Oxide | Oxide (weight %) | MoO$_3$ (weight %) | Resistance to salt spray (N° hours) |
|---|---|---|---|---|
| 15 | — | 0 | 0 | 288 |
| 16 | — | 0 | 0.9 | 400 |
| 17 | Y$_2$O$_3$ Rhodia | 3 | 0 | 1056 |
| 18 | Y$_2$O$_3$ Rhodia | 3 | 0.9 | >1500 |
| 19 | Y$_2$O$_3$ Sogemet | 3 | 0 | 1296 |
| 20 | Y$_2$O$_3$ Sogemet | 3 | 0.9 | >1656 |
| 21 | CeO$_2$ Rhodia | 3 | 0 | 144 |
| 22 | CeO$_2$ Rhodia | 3 | 0.9 | 720 |
| 23 | CeO$_2$ Sogemet | 3 | 0 | 144 |
| 24 | CeO$_2$ Sogemet | 3 | 0.9 | 792 |
| 25 | La$_2$O$_3$ Rhodia | 3 | 0 | 336 |
| 26 | La$_2$O$_3$ Rhodia | 3 | 0.9 | 552 |
| 27 | La$_2$O$_3$ Sogemet | 3 | 0 | 552 |
| 28 | La$_2$O$_3$ Sogemet | 3 | 0.9 | 864 |
| 29 | Pr$_6$O$_{11}$ | 3 | 0 | 504 |
| 30 | Pr$_6$O$_{11}$ | 3 | 0.9 | 864 |
| 31 | Nd$_2$O$_3$ | 3 | 0 | 288 |
| 32 | Nd$_2$O$_3$ | 3 | 0.9 | 1560 |
| 33 | ZrO$_2$ | 3 | 0 | 288 |
| 34 | ZrO$_2$ | 3 | 0.9 | 456 |

Table 11 clearly shows that the addition of oxide of yttrium, lanthanum, praseodymium, neodymium or zirconium to coating compositions increases the resistance to salt spray of the samples treated with these compositions. The best oxide appears to be Y$_2$O$_3$, but Neodymium, Praseodynium and Lanthanum give also very good results too.

Furthermore, when the oxide is associated with molybdenum oxide MoO$_3$, the anticorrosion performance is further improved. An interaction is observed or a synergy effect between the oxide and MoO$_3$, which increases the composition's anticorrosion performance.

The invention claimed is:

1. An anticorrosion coating composition for metal parts, which composition contains:
   at least one particulate metal;
   a reinforcing agent for the anticorrosion properties of the composition selected from the group consisting of yttrium, zirconium, lanthanum, cerium, praseodymium and neodymium, in the form of salts associated with molybdenum oxide (MoO$_3$);
   a binder; and
   water optionally associated with one or more organic solvents.

2. The composition according to claim 1, wherein the composition contains 0.5% to 2% by weight molybdenum oxide (MoO$_3$).

3. The composition according to claim 2, wherein the composition contains 10% to 40% by weight of at least one particulate metal.

4. The composition according to claim 1, wherein the particulate metal is selected from the group consisting of zinc, aluminium, tin, manganese, nickel, their alloys, and their mixtures.

5. The composition according to claim 4, wherein said reinforcing agent for the anticorrosion properties of the composition is yttrium.

6. The composition according to claim 1, wherein the particulate metal is selected from the group consisting of zinc, aluminium, their alloys and their mixtures.

7. The composition according to claim 1, wherein the composition contains 0.5% to 10% by weight of said reinforcing agent for the anticorrosion properties of the composition, relative to the weight of the composition.

8. The composition of claim 7, wherein the composition contains from 1% to 8% by weight of said reinforcing agent, relative to the weight of the composition.

9. The composition of claim 8, wherein the composition contains from 1% to 7% by weight of said reinforcing agent, relative to the weight of the composition.

10. The composition according to claim 1, wherein said reinforcing agent for the anticorrosion properties of the composition is cerium.

11. The composition according to claim 10, wherein said cerium reinforcing agent is in the form of cerium chloride.

12. The composition according to claim 1, wherein said reinforcing agent for the anticorrosion properties of the composition is associated with molybdenum oxide (MoO$_3$) in a weight proportion 0.25<anticorrosion property reinforcing agent MoO$_3$<20.

13. The composition according to claim 12, wherein said reinforcing agent is associated with molybdenum oxide in a weight proportion 0.5<anticorrosion property reinforcing agent: MoO$_3$<16.

14. The composition according to claim 13, wherein said reinforcing agent is associated with molybdenum oxide in a weight proportion 0.5<anticorrosion property reinforcing agent: MoO$_3$<14.

15. The composition according to claim 1, wherein the composition contains 3% to 20% by weight of an organic binder and/or mineral binder, in aqueous phase.

16. The composition according to claim 1, wherein the binder is selected from the group consisting of an alkoxylated silane, a silicone resin, a colloidal silica, a silicate of sodium, a silicate of potassium, a silicate of lithium, a zirconate, a titanate, an epoxy resin, a phenoxy resin, an acrylic and their mixtures.

17. The composition according to claim 16, wherein the binder is an organo-functionalised silane selected from the group consisting of γ-glycidoxypropyl-trimethoxysilane and γ-glycidoxypropyltriethoxysilane.

18. The composition according to claim 16, wherein the binder is an alkoxylated silane and the alkoxylated silane is organofunctionalized.

19. The composition according to claim 16, wherein the binder is associated with a crosslinking agent selected from the group consisting of a phenolic crosslinking agent and an aminoplastic crosslinking agent.

20. The composition according to claim 1, wherein the composition contains an organic solvent selected from the group consisting of white spirit, alcohols, ketones, aromatic solvents, glycol solvents, acetates, nitropropane, and their mixtures.

21. The composition according to claim 20, wherein the organic solvent is a glycol solvent.

22. The composition according to claim 21, wherein the glycol solvent is a glycol ether solvent.

23. The composition according to claim 22, wherein the glycol ether solvent is selected from the group consisting of diethyleneglycol, triethyleneglycol, dipropyleneglycol, polyethyleneglycol, and their mixtures.

24. The composition according to claim 1, wherein the composition further contains up to 7% by weight of a thickening agent.

25. The composition according to claim 1, wherein said thickening agent is selected from the group consisting of cellulose derivatives, xanthane gum, polyurethane thickeners, acrylic thickeners, silicas, silicates, organophilic clays, and their mixtures.

26. The composition according to claim 25, wherein the thickening agent is a cellulose derivative selected from the group consisting of hydroxymethyl cellulose, hydroxyethyl cellulose, hydroxypropyl cellulose, hydroxypropylmethyl cellulose, and their mixtures.

27. The composition according to claim 25, wherein the thickening agent is a silicate selected from the group consisting of magnesium silicates, lithium silicates, and their mixtures.

28. The composition according to claim 27, wherein the selected silicate is a treated silicate.

29. The composition according to claim 1, wherein the composition further contains a lubricating agent to obtain a self-lubricated system selected from the group consisting of polyethylene, polytetrafluoroethylene, $MoS_2$, graphite, polysulfones, synthetic waxes, natural waxes, nitrides, and their mixtures.

30. The composition according to claim 1, wherein the composition further contains an additive selected from the group consisting of an antifoam agent, a wetting agent, a surfactant and a biocide.

31. The composition according to claim 1, wherein the composition contains:
- 10% to 40% by weight of at least one particulate metal;
- 0.5% to 10% of a reinforcing agent for the anticorrosion properties of the composition selected from the group consisting of yttrium, zirconium, lanthanum, cerium, praseodymium and neodymium, in the form salts, associated with molybdenum oxide ($MoO_3$);
- up to 7% by weight of a thickener;
- 3% to 20% by weight of a binder;
- up to 3% by weight of at least one agent selected from the group consisting of sodium silicate, potassium silicate, lithium silicate, and combinations thereof;
- up to 7% by weight of one or more lubricating agents;
- 1% to 30% by weight of an organic solvent or a mixture of organic solvents, and
- water to make up to 100%.

32. The composition according to claim 31, wherein the composition further contains 0.1% to 10% by weight of a weak mineral acid.

33. The composition according to claim 32, wherein the weak mineral acid is boric acid.

34. The composition according to claim 31, wherein the composition further contains 0.01% to 1% by weight of an anionic surfactant.

35. The composition according to claim 31, wherein the composition contains between 0.05% and 2% by weight of at least one agent selected from the group consisting of sodium silicate, potassium silicate, lithium silicate, and combinations thereof.

36. A metal substrate, coated with an anticorrosion coating, wherein the coating is established on said metal substrate by spraying, dip-draining or dip-centrifuging a layer of the composition of claim 1 on said metal substrate, and by baking said layer by convection or infrared.

37. The coated metal substrate according to claim 36, wherein baking is performed at a temperature of between 79° C. and 350° C. for approximately 10 to 60 minutes, by convection.

38. The coated metal substrate according to claim 36, wherein said layer is subjected to a drying operation, by convection or infrared.

39. The coated metal substrate according to claim 38, wherein drying is performed by convection at a temperature of about 70° C. for approximately 10 to 30 minutes prior to the baking operation.

40. The metal substrate according to claim 36, wherein said layer is applied to said metal substrate to be protected with a dry film thickness of between 3 μm (11 g/m$^2$) and 15 μm (55 g/m$^2$).

41. The metal substrate according to claim 40, wherein said layer is applied to said metal substrate to be protected with a dry film thickness of between 4 μm (15 g/m$^2$) and 10 μm (40 g/m$^2$).

42. The metal substrate according to claim 41, wherein said layer is applied to said metal substrate to be protected with a dry film thickness of between 5 μm (18 g/m$^2$) and 10 μm (40 g/m$^2$).

43. The metal substrate according to claim 40, wherein the anticorrosion coating is itself coated with another coating comprising an alkaline silicate, in particular a sodium and/or potassium and/or lithium silicate, an acrylic, a zirconate, a titanate, a silane, an epoxy resin, a phenol resin or one of their mixtures.

44. The metal substrate according to claim 40, wherein the anticorrosion coating is itself coated with another coating comprising a lubricating agent chosen from among polyethylene, polytetrafluoroethylene, $MoS_2$, graphite, polysulfones, synthetic or natural waxes and nitrides and their mixtures.

* * * * *